United States Patent
Gantner et al.

(10) Patent No.: US 8,500,580 B2
(45) Date of Patent: Aug. 6, 2013

(54) TORQUE SENSOR FOR A BELT-DRIVEN CONICAL-PULLEY TRANSMISSION

(75) Inventors: Wolfgang Gantner, Sinzheim (DE); Andreas Götz, Rastatt (DE); Eugen Kremer, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1463 days.

(21) Appl. No.: 11/728,215

(22) Filed: Mar. 24, 2007

(65) Prior Publication Data
US 2007/0249439 A1    Oct. 25, 2007

(30) Foreign Application Priority Data
Mar. 24, 2006  (DE) .......... 10 2006 013 795

(51) Int. Cl.
*F16H 59/00*    (2006.01)
*F16H 61/00*    (2006.01)
*F16H 63/00*    (2006.01)

(52) U.S. Cl.
USPC ................ 474/15; 474/12; 474/13

(58) Field of Classification Search
USPC ................. 474/12, 13, 15
See application file for complete search history.

(56) References Cited

U.S. PATENT DOCUMENTS

| | | | | |
|---|---|---|---|---|
| 2,155,351 A * | 4/1939 | Paulus | ............ | 474/12 |
| 2,678,566 A * | 5/1954 | Oehrli | ............ | 474/15 |
| 3,757,593 A * | 9/1973 | Svenson | ............ | 474/12 |
| 3,786,688 A * | 1/1974 | Svenson | ............ | 474/19 |
| 3,850,050 A * | 11/1974 | Lemmens | ............ | 475/208 |
| 3,866,487 A * | 2/1975 | Key | ............ | 474/15 |
| 4,028,953 A * | 6/1977 | Lavallee | ............ | 474/13 |
| 4,360,353 A * | 11/1982 | Hattori et al. | ............ | 474/12 |
| 4,585,429 A * | 4/1986 | Marier | ............ | 474/12 |
| 5,279,402 A * | 1/1994 | Beigang | ............ | 192/57 |
| 5,295,915 A * | 3/1994 | Friedmann | ............ | 474/18 |
| 5,527,225 A * | 6/1996 | Dick | ............ | 474/12 |
| 6,120,399 A * | 9/2000 | Okeson et al. | ............ | 474/14 |
| 6,270,436 B1 * | 8/2001 | Reik et al. | ............ | 474/8 |
| 6,786,844 B2 * | 9/2004 | Fritzer et al. | ............ | 475/210 |
| 7,517,295 B2 * | 4/2009 | Faust | ............ | 474/18 |
| 2002/0111248 A1 * | 8/2002 | Schmid | ............ | 477/44 |

FOREIGN PATENT DOCUMENTS

| | | |
|---|---|---|
| DE | 42 34 294 A1 | 4/1993 |
| DE | 101 60 865 A1 | 6/2002 |
| DE | 102 03 944 A1 | 8/2002 |

* cited by examiner

*Primary Examiner* — William A Rivera
*Assistant Examiner* — Henry Liu
(74) *Attorney, Agent, or Firm* — Alfred J. Mangels

(57) ABSTRACT

A torque sensor for a belt-driven conical-pulley transmission. A first ramp surface is rigidly connected to a shaft of a conical disk pair, and a second ramp surface is rigidly connected to a sensing piston surrounding the shaft and axially and rotatably movable relative to the shaft. Balls are positioned between and in contact with the ramp surfaces and with a guide surface rigidly connected with an axially movable disk. The guide surface is so configured that the contact points of a particular ball with the ramp surfaces, the contact point of that ball with the guide surface, and the center point of that ball lie in a radially oriented plane.

4 Claims, 2 Drawing Sheets

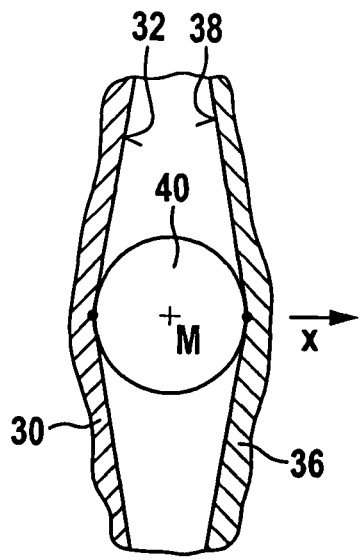
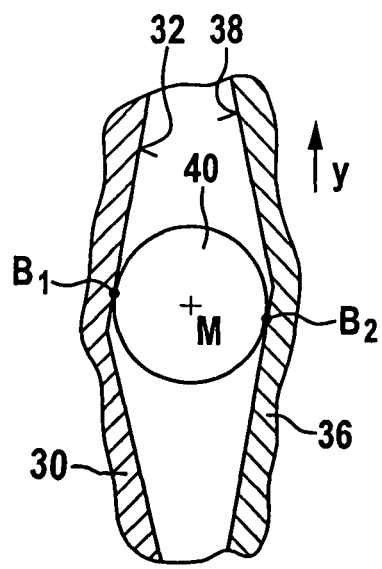
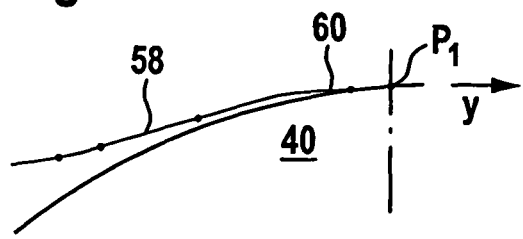
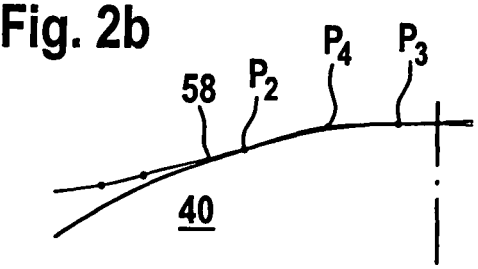
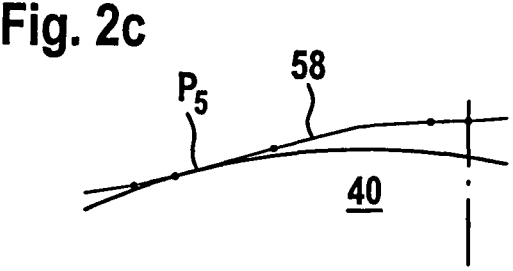
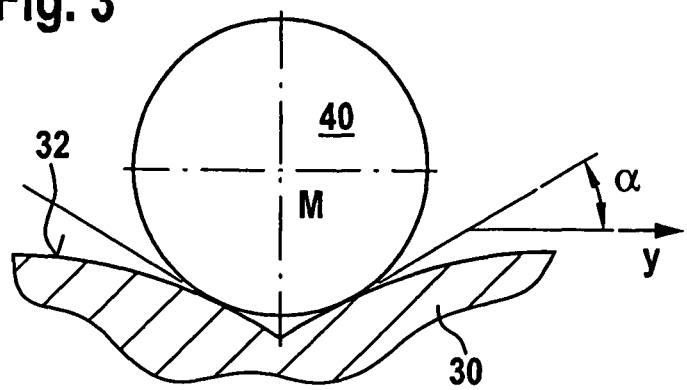

TORQUE SENSOR FOR A BELT-DRIVEN CONICAL-PULLEY TRANSMISSION

BACKGROUND OF THE INVENTION

1. Field of the Invention

The present invention relates to a torque sensing device for use in a belt-driven conical-pulley transmission.

2. Description of the Related Art

Belt-driven conical-pulley transmissions, such as are employed for example in motor vehicles, generally include two pairs of conical disks that are encircled by an endless torque-transmitting means, for example a plate-link chain. By changing the spacing between the conical disks of each conical disk pair in opposite directions, the transmission ratio of the transmission can be varied continuously.

Advantageously, a conical disk pair, preferably the one on the power input side, includes an integrated torque sensor with which the torque acting from a drive engine is detected and a pressure between the conical disks of the corresponding disk pair is changed in accordance with the torque.

Such belt-driven conical-pulley transmissions with integrated torque sensor are described for example in published German patent applications DE 42 34 294 A1, DE 19 54 644 A1, DE 40 26 683, DE 195 45 492 A1 and DE 199 51 950 A1.

FIG. 4 shows a cross section through an input-side part of a belt-driven conical-pulley transmission. On an input shaft 10, which is made in a single piece with a fixed disk (not shown), a movable disk 14 is positioned so that it can be shifted axially but is non-rotatably connected to the input shaft.

On the back side of movable disk 14 in its radially outer area, a cylindrical ring 16 having two axially-extending annular walls spaced at a radial distance from each other is rigidly attached. A piston 18 operates within cylindrical ring 16 so that on the right side of piston 18, as viewed in FIG. 4, a first pressure chamber 20 is formed that can be subjected to hydraulic pressure through radial bores 22 in movable disk 14. An annular chamber 24 is provided between movable disk 14 and shaft 10, and a radial bore 26 and an axial bore 28 in shaft 3 allows changeable hydraulic pressure to adjust the transmission ratio.

Piston 18, which is of annular form, is rigidly connected to a support ring 30 which is substantially cup-shaped and is rigidly connected to input shaft 10. Ramp surfaces 32 are formed on the end face of support ring 30 that faces movable disk 14.

Also situated inside support ring 30 is an axially movable sensing piston 36 that is of annular form. Piston 36 carries a sealing ring that engages the outer surface of input shaft 10 and a further sealing ring that engages an inner circumferential surface of support ring 30. Sensing piston 36 includes an annular extension directed toward movable disk 14 and on which ramp surfaces 38 are formed that constitute countersurfaces to the ramp surfaces 32. Between ramp surfaces 32 and 38 are rolling elements, in the illustrated example balls 40.

Between sensing piston 36 and movable disk 14 a second pressure chamber 42 is provided, which is subjected to hydraulic pressure through a supply line 44 leading through the shaft, the hydraulic fluid being removable through a drain line 46 that is also formed in input shaft 3.

The effective cross section of the supply orifice 48 that leads into the second pressure chamber 42 is determined by the axial position of movable disk 14 relative to shaft 10. The effective cross section of the drain orifice 50 leading out of the second pressure chamber 42 is determined by the position of the sensing piston 36. The sensing piston 36 includes circumferentially-spaced axial arms 52 that extend through openings in the wall of support ring wall 30. The radial outer surfaces of the arms 52 are provided with axially and radially directed teeth, which mesh with inner teeth of an input wheel 54. Input wheel 54 is rotatably carried on input shaft 10 supported by a bearing 58 so that it is essentially axially immovable on the input shaft.

Radially within cylindrical ring 16, which is rigidly connected to movable disk 14, an annular ring component 56 is rigidly connected. An inner guide surface 58 is provided on ring component 56, against which the balls 40 lie, and which limits the radial outward movement of the balls.

The construction and the function of the arrangement described so far are known and will therefore be explained only briefly.

When there is a torque from the rotationally drivable input wheel 54 acting on sensing piston 36, that torque is transmitted via the ramp surfaces 38, the balls 40, and the ramp surfaces 32 to the support ring 30 and thus to the shaft 10. The ramp surfaces are designed in such a way that as the input torque increases the sensing piston 36 moves to the right, as viewed in FIG. 4, so that the drain orifice 50 is increasingly closed. As the effective size of the drain orifice 50 becomes smaller, the pressure in the second pressure chamber 42 increases, so that a pressure that is a function of the input torque acts against movable disk 14. With movable disk 14 shifted as far as possible to the left (maximum underdrive of the transmission), supply line opening 48 is closed, so that second pressure chamber 42 is unpressurized. Because the effective radius of guide surface 58 becomes smaller when movable disk 14 is repositioned to the right, as viewed in FIG. 4, the contact between the balls and the ramp surfaces is shifted in the radially inward direction as movable disk 14 is shifted increasingly to the right, causing the pressure in second pressure chamber 42 to be modulated increasingly depending upon the transmission ratio, since the slopes of the ramp surfaces depend upon the radial distance of the contact points between the balls and the ramp surfaces from the axis of input shaft 10. Thus, the slopes of the wedge surfaces are generally greater in the radially inner direction than in the radially outer direction.

The known torque sensing device, formed in particular by sensing piston 36, ramp surfaces 32 and 38, as well as guide surface 58 and balls 40, has the following particular characteristics:

As the speed of rotation of input shaft 10 increases, an increasing centrifugal force acts on the balls 40, which force is generally not completely absorbed by the reaction forces of the ramp surfaces and the guide surface, so that the pressure in second pressure chamber 42 become dependent upon the speed of rotation. That can cause slipping of the belt-driven conical-pulley transmission, or overloading, or even hysteresis.

When the slope of the ramp surfaces in the circumferential direction is dependent only on their distance from the axis of input shaft 10 (radial dependency), the perpendicular to the rolling surface on which the balls roll on the ramp surfaces has a radial component. The center point of the ball and the contact point between ball and ramp are therefore on different radii. This difference is approximately proportional to the axial displacement of the guide piston. As a result, the relationship between the contact pressure (pressure in the second pressure chamber) and the torque is dependent not only on the transmission ratio, but also upon the volume flow and the backup pressure of the hydraulic medium flowing through the second pressure chamber 42, and on the torque.

An object of the present invention is to provide a torque sensor with which the previously described unfavorable dependencies of the ascertained torque on the speed of rotation, the volume flow, the back pressure, and other variables are avoided.

SUMMARY OF THE INVENTION

A first solution to the object of the invention is achieved with a torque sensing device for a belt-driven conical-pulley transmission, which torque sensing device includes a ramp surface that is rigidly connected to a shaft of a conical disk pair, and an additional ramp surface that is rigidly connected to a sensing piston that surrounds the shaft and that is axially movable and rotatable relative to the shaft. The ramp surfaces are designed in such a way that when a change occurs in the effective torque between the sensing piston and the shaft, the axial position of the sensing piston changes through the rolling along the ramp surfaces of balls situated between the ramp surfaces and a guide surface that is fixedly positioned relative to an axially movable conical disk. On the radially inner side of the guide surface the balls are in contact, the movable disk being connected to the shaft in a rotationally fixed and axially movable connection and being forced in the direction of a fixed disk that is rigidly connected to the shaft. The force is provided by a hydraulic pressure that is a function of the axial position of the sensor piston. The guide surface is formed in such a way that the radial distance between the balls and the axis of the shaft is dependent on the axial distance between the axially movable disk and the axially fixed disk, and in such a way that the contact points of a particular ball with the ramp surfaces, the contact point of the ball with the guide surface, and the center point of the ball lie in a radially oriented plane.

The result is that the centrifugal force is completely taken over by reaction forces, and does not cause any unfavorable dependency of the clamping pressure on the speed of rotation.

A further solution to the object of the invention is achieved with a torque sensing device for a belt-driven conical-pulley transmission, which torque sensing device includes a ramp surface that is rigidly connected to a shaft of a conical disk pair, an additional ramp surface that is rigidly connected to a sensing piston that surrounds the shaft and is axially movable and rotatable relative to the shaft. The ramp surfaces are designed in such a way that when a change occurs in the effective torque between the sensing piston and the shaft, the axial position of the sensing piston changes through rolling along the ramp surfaces of balls situated between the ramp surfaces and a guide surface that is fixedly positioned relative to an axially movable conical disk. The balls contact the radially inner side of the guide surface, the movable disk being connected to the shaft in a rotationally fixed and axially movable connection and being forced in the direction of an axially fixed disk that is rigidly connected to the shaft. The force is provided by a hydraulic pressure that is a function of the axial position of the sensor piston. The guide surface is formed in such a way that the radial distance between the balls and the axis of the shaft is a function of the axial distance between the axially movable disk and the axially fixed disk, and in such a way that the contact points of a particular ball with the ramp surfaces and the contact point of that ball with the guide surface lie in a plane that is at a predetermined angle to the radial direction.

The result is that the centrifugal force causes a dependency of the clamping pressure on the speed of rotation which is determinable by the angle, and which can be taken into account when controlling the transmission.

An advantageous feature of the invention is that the slope of the ramp surfaces decreases with increasing distance from their lowest point, in such a way that the quotient of clamping pressure and torque is essentially independent of the positions of the ramp surfaces and the guide surface relative to each other. That makes it possible to compensate for the negative effect of the radial shift of the contact point relative to the center points of the balls, which is achieved by the fact that the radial, axial, and circumferential shifts for each specified position of the guide surface are arranged in such a way that the relationship between torque and clamping force, or force in the second pressure chamber, remains essentially constant.

BRIEF DESCRIPTION OF THE DRAWINGS

The structure, operation, and advantages of the present invention will become further apparent upon consideration of the following description, taken in conjunction with the accompanying drawings in which:

FIGS. 1a and 1b show two sectional views, cut in the plane I-I of FIG. 4, with different positions of the ramp surfaces relative to each other in the circumferential direction;

FIGS. 2a, 2b, and 2c show three sectional views, cut in the plane II-II of FIG. 4, where the ball is in different positions relative to the guide surface in the circumferential direction;

FIG. 3 is a view similar to that of FIG. 1, with a different shape of ramp surface compared to FIG. 1.

DESCRIPTION OF THE PREFERRED EMBODIMENTS

Figure 4:
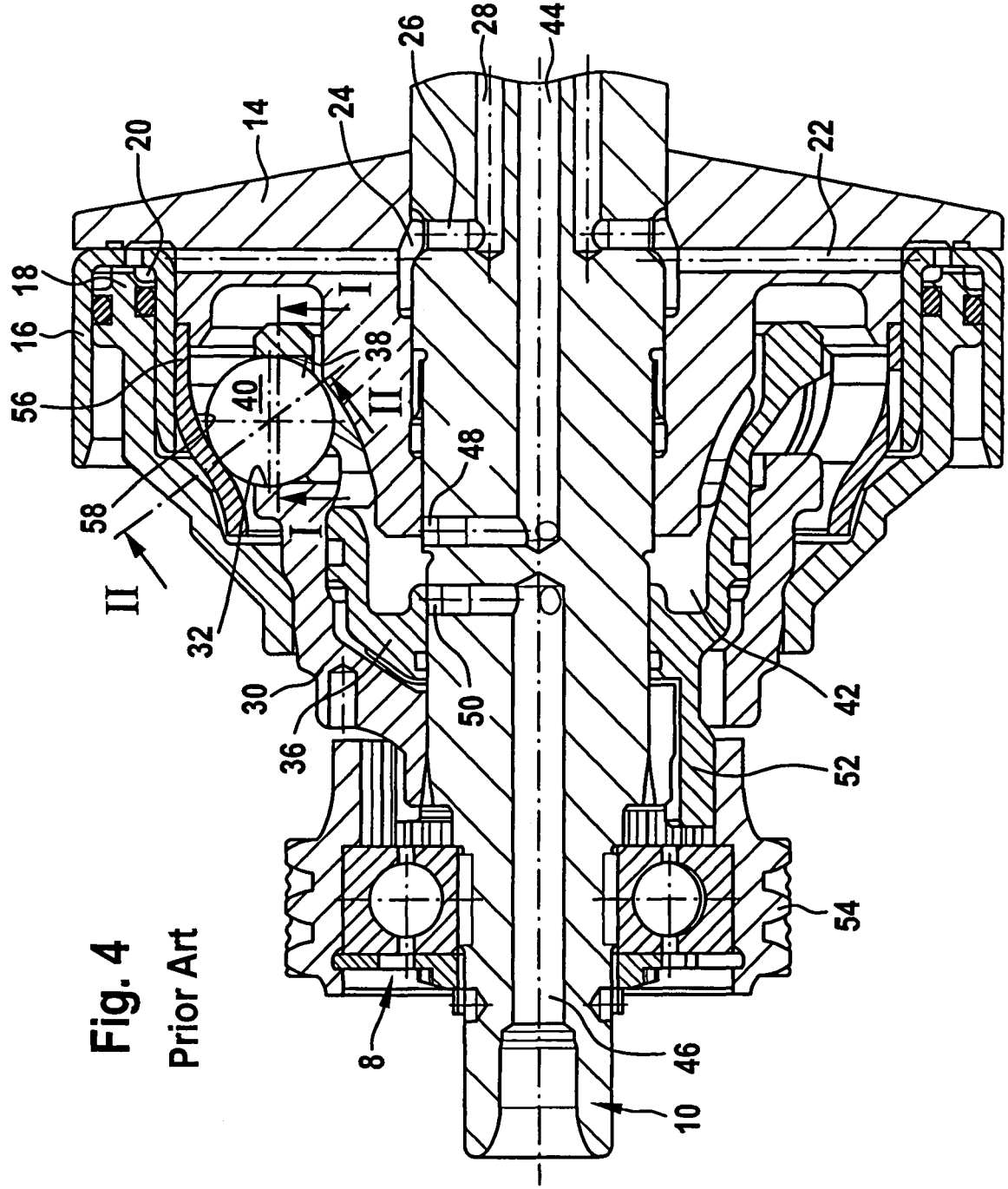
FIG. 4 is a longitudinal sectional view through the input-side portion of a known belt-driven conical-pulley transmission.

The component geometry in accordance with the invention described below can be utilized in a transmission having the structure shown in FIG. 4.

FIG. 1a shows a ball 40 between the ramp surfaces 32 and 38, which are formed repeatedly in the circumferential direction on the support ring 30 and the sensing piston 36, respectively.

FIG. 1a represents the torque-free state, in which sensing piston 36 has come to its closest proximity to support ring 30. In the position represented in FIG. 1b the ramp surface 38 formed on sensing piston 36 is shifted in the circumferential direction (y) relative to the ramp surface 32 of support ring 30 by a torque introduced by the input wheel 54. As a result, the ball 40 rolls along the ramp surfaces by a certain amount and enlarges the axial spacing between ramp surface 32 of support ring 30 and ramp surface 38 of sensing piston 36. As can be seen, that rolling movement causes a line connecting contact points $B_1$ and $B_2$ and the center point M of the ball to assume an angle relative to the X direction (the direction of the axis of the input shaft 10). In order for a plane that contains the contact points $B_1$, $B_2$, the center point M of the ball and the contact point of the ball with the guide surface 58 to remain in its radial orientation, the guide surface 58, viewed in section in accordance with view II-II of FIG. 4, has the form shown in FIG. 2a, only one half being shown, starting from the position that is located over the lowest place in the ramp surface 32 of support ring 30 in the circumferential direction. As can be seen, the guide surface 58 has in its middle area a plateau 60, at which the ball 40 is in contact at point $P_1$ in the position as shown in FIG. 2a.

FIG. 2b shows the contact between ball 40 and guide surface 58 in the FIG. 1b condition, with contact points $P_2$, $P_3$ migrating laterally and a plane that contains the points $B_1$, M, $B_2$, $P_4$ (the center between $P_2$ and $P_3$) remaining in its radial orientation.

In the position shown in FIG. 2c, which corresponds to the pump position, i.e., the maximum shift between the ramp surfaces 30 and 36 in the circumferential direction, contact point $P_5$ has migrated even farther outward compared to the effective contact point $P_4$ of FIG. 2b.

Guide surface 58 can be coordinated with the ramp surfaces 32 and 38 in such a way that a plane that contains the contact points of the balls with the ramp surfaces and the guide surface, as well as the center of the ball, lies in the radial orientation. That ensures that the centrifugal force acting on the balls 40 as the speed of rotation increases is completely taken over by reaction forces, and that there is no unfavorable dependency of the clamping pressure on the speed of rotation. The guide surface 58 can also be designed in such a manner that the contact points of the balls with the ramp surfaces and with the guide surface determine a plane which is at a prescribed angle from the radial direction. That causes a prescribable dependency of the clamping pressure on the speed of rotation, which dependency can be taken into account in the hydraulic control system of the belt-driven conical-pulley transmission.

FIG. 3 shows a form of the ramp surfaces modified from that shown in FIG. 1, with only ramp surface 32 of support ring 30 being shown. As can be seen, the slope a of ramp surface 32 changes in the circumferential direction y, with the slope becoming smaller as the distance from the lowest point increases. With that slope change, which declines in the circumferential direction, it is possible to compensate for the negative influence of the radial shift of the contact point in reference to the ball center M. In that regard, the radial, axial, and circumferential shifts change with each specified position of the ramp surface 32 or the guide surface 58 in such a way that the quotient of $r \cdot \tan(\alpha)$, corresponding to the torque, and the clamping pressure, or the pressure in the second pressure chamber 42, remains essentially constant with a change in r and/or $\alpha$. r is the radial distance of contact point B from the axis of input shaft 10, and $\alpha = \alpha(r)$ is the main ramp angle that is a function of the radial distance, i.e., the slope of the ramp at the lowest position of ball 40, which is the position shown in FIG. 3.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A torque sensing device for a belt-driven conical-pulley transmission, said torque sensing device comprising: a first ramp surface rigidly connected to a shaft that carries a pair of conical disks; a second ramp surface rigidly connected to a sensing piston that surrounds the shaft and that is axially movable along and rotatable relative to the shaft, wherein the ramp surfaces face each other and are configured so that upon a change in torque between the sensing piston and the input shaft the axial position of the sensing piston changes through the rolling of balls positioned between and contacting the ramp surfaces; a radially inwardly facing guide surface fixedly positioned relative to an axially movable conical disk, wherein the balls contact the guide surface; wherein the axially movable disk is non-rotatably and axially movably connected to the shaft for axial movement relative to an axially fixed disk that is rigidly connected to the shaft, and wherein axial movement of the axially movable conical disk is effected by a hydraulic pressure that is a function of the axial position of the sensing piston and that acts against a face of the axially movable conical disk; and wherein the guide surface is configured in such a way that a radial distance between the balls and the axis of the shaft is a function of the axial distance between the axially movable disk and the axially fixed disk, wherein in the circumferential direction of the torque sensing device the guide surface includes a plateau region on each side of which is a convexly-curved region, and the contact points of a particular ball with the ramp surfaces, the contact point of that ball with the guide surface, and the center point of that ball each lie in a radially oriented plane, wherein the radially-oriented plane is relative to the shaft longitudinal axis.

2. A torque sensing device for a belt-driven conical-pulley transmission, said torque sensing device comprising: a first ramp surface rigidly connected to a shaft that carries a pair of conical disks; a second ramp surface rigidly connected to a sensing piston that surrounds the shaft and that is axially movable along and rotatable relative to the shaft, wherein the ramp surfaces face each other and are configured so that upon a change in torque between the sensing piston and the input shaft the axial position of the sensing piston changes through the rolling of balls positioned between and contacting the ramp surfaces; a radially inwardly facing guide surface fixedly positioned relative to an axially movable conical disk, wherein the balls contact the guide surface; wherein the axially movable disk is non-rotatably and axially movably connected to the shaft for axial movement relative to an axially fixed disk that is rigidly connected to the shaft, and wherein axial movement of the axially movable conical disk is effected by a hydraulic pressure that is a function of the axial position of the sensing piston and that acts against a face of the axially movable conical disk; and wherein the guide surface is configured in such a way that a radial distance between the balls and the axis of the shaft is a function of the axial distance between the axially movable disk and the axially fixed disk, wherein in the circumferential direction of the torque sensing device the guide surface includes a plateau region on each side of which is a convexly-curved region, and the contact points of a particular ball with the ramp surfaces, the contact point of that ball with the guide surface, and the center point of that ball each lie in a plane that is at a predetermined angle to the radial direction, wherein the predetermined angle of the plane is relative to the shaft longitudinal axis.

3. A torque sensing device in accordance with claim 1, wherein the ramp surfaces each have a slope relative to a circumferential direction that decreases with increasing distance from a lowest point, so that the quotient of a clamping pressure applied to the movable disk and torque is substantially independent of the positions of the ramp surfaces and the guide surface relative to each other.

4. A torque sensing device in accordance with claim 2, wherein the ramp surfaces each have a slope relative to a circumferential direction that decreases with increasing distance from a lowest point, so that the quotient of a clamping pressure applied to the movable disk and torque is substantially independent of the positions of the ramp surfaces and the guide surface relative to each other.

* * * * *